(12) United States Patent
Langereis et al.

(10) Patent No.: US 9,907,080 B2
(45) Date of Patent: Feb. 27, 2018

(54) TRIGGERING OF TRANSMISSION TIME INTERVAL BUNDLING BASED ON FREQUENCY SELECTIVE CHANNEL QUALITY INFORMATION IN A RADIO COMMUNICATION SYSTEM

(71) Applicant: Telefonaktiebolaget LM Ericsson (publ), Stockholm (SE)

(72) Inventors: Alexander Langereis, Sigtuna (SE); Jawad Manssour, Seoul (KR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 97 days.

(21) Appl. No.: 14/897,562

(22) PCT Filed: Jun. 11, 2013

(86) PCT No.: PCT/SE2013/050661
§ 371 (c)(1),
(2) Date: Dec. 10, 2015

(87) PCT Pub. No.: WO2014/200396
PCT Pub. Date: Dec. 18, 2014

(65) Prior Publication Data
US 2016/0128076 A1    May 5, 2016

(51) Int. Cl.
*H04W 72/08* (2009.01)
*H04L 1/00* (2006.01)
(Continued)

(52) U.S. Cl.
CPC ......... *H04W 72/085* (2013.01); *H04L 1/0009* (2013.01); *H04L 5/006* (2013.01); *H04W 24/02* (2013.01); *H04W 52/241* (2013.01); *H04W 72/00* (2013.01); *H04W 72/042* (2013.01); *H04W 72/0446* (2013.01);
(Continued)

(58) Field of Classification Search
None
See application file for complete search history.

(56) References Cited

U.S. PATENT DOCUMENTS

2007/0223614 A1*  9/2007  Kuchibhotla ......... H04L 1/1887
                                                    375/267
2011/0085519 A1   4/2011  Koivisto et al.
(Continued)

FOREIGN PATENT DOCUMENTS

WO     2009126902 A2    10/2009

OTHER PUBLICATIONS

Unknown, Author, "Discussion on PRB bundling for rank 1-8", CATT, 3GPP TSG RAN WG1 Meeting #60, R1-100884, San Francisco, USA, Feb. 22-26, 2010, 1-3.
(Continued)

*Primary Examiner* — Chi H Pham
*Assistant Examiner* — Shick Hom
(74) *Attorney, Agent, or Firm* — Murphy, Bilak & Homiller, PLLC

(57) ABSTRACT

There is provided a method and corresponding network node for handling TTI bundling in a radio communication system. The method comprises the steps of obtaining (S1) frequency-selective channel quality information for at least one User Equipment (UE), and determining (S2) whether TTI bundling should be enabled or disabled for the UE(s) based on the frequency-selective channel quality information. By using frequency-selective channel quality information, more accurate decisions of whether TTI bundling should be enabled or disabled can be made, thus leading to more efficient resource utilization.

21 Claims, 13 Drawing Sheets

(51) Int. Cl.
*H04L 5/00* (2006.01)
*H04W 72/00* (2009.01)
*H04W 24/02* (2009.01)
*H04W 52/24* (2009.01)
*H04W 76/04* (2009.01)
*H04W 28/06* (2009.01)
*H04W 72/04* (2009.01)
*H04W 88/02* (2009.01)
*H04W 88/08* (2009.01)

(52) U.S. Cl.
CPC ..... *H04W 72/0453* (2013.01); *H04W 72/0473* (2013.01); *H04W 76/046* (2013.01); *H04W 28/06* (2013.01); *H04W 72/04* (2013.01); *H04W 88/02* (2013.01); *H04W 88/08* (2013.01)

(56) References Cited

U.S. PATENT DOCUMENTS

2012/0026986 A1* 2/2012 Dass .................. H04W 72/085
 370/336
2014/0241320 A1* 8/2014 Wu ...................... H04L 1/1841
 370/331

OTHER PUBLICATIONS

Unknown, Author, "DMRS discussion for rank 5-8", Huawei, 3GPP TSG RAN WG1 meeting #59bis, R1-100246, Valencia, Spain, Jan. 18-22, 2010, 1-6.

* cited by examiner

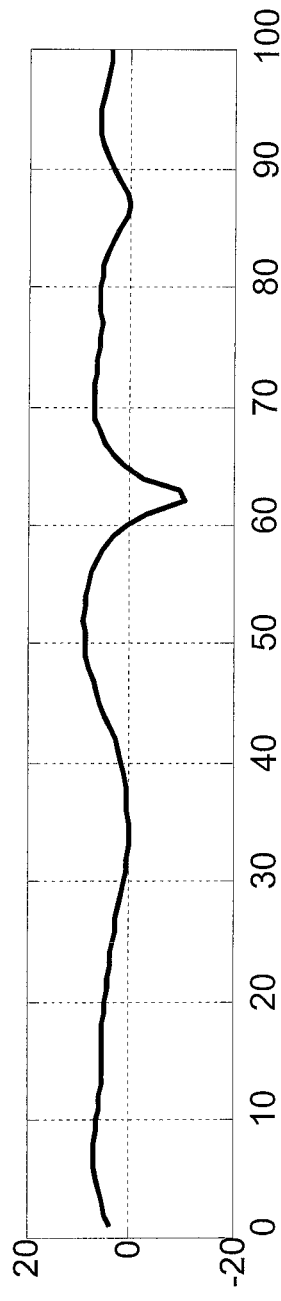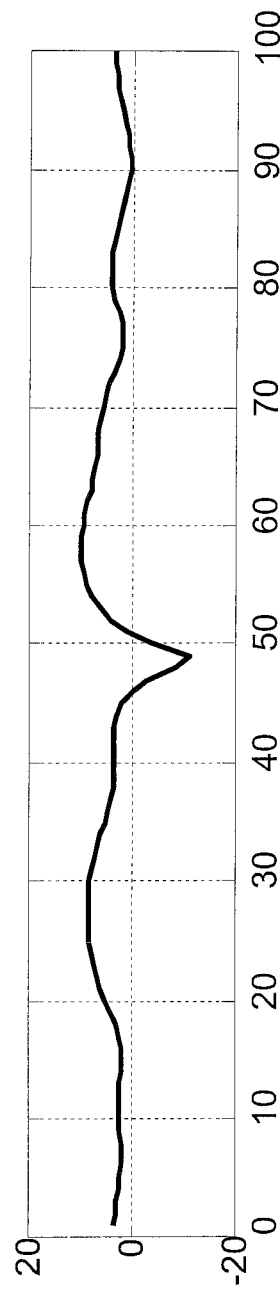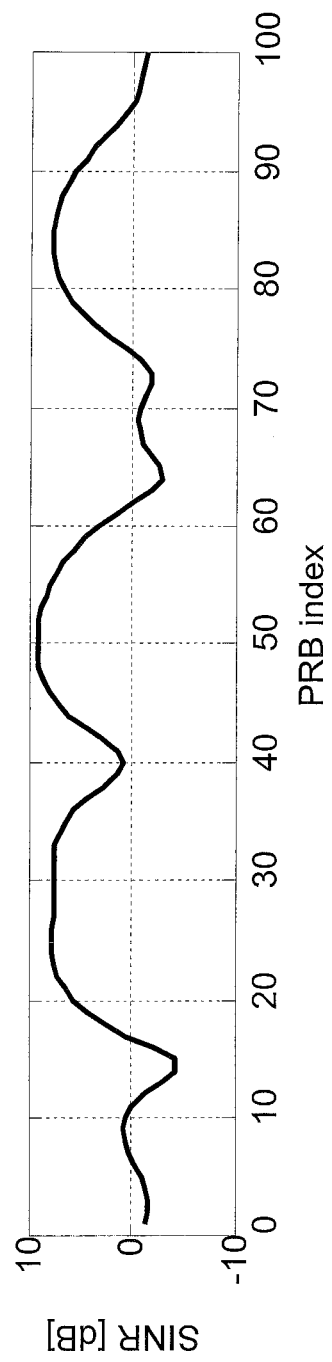

TRIGGERING OF TRANSMISSION TIME INTERVAL BUNDLING BASED ON FREQUENCY SELECTIVE CHANNEL QUALITY INFORMATION IN A RADIO COMMUNICATION SYSTEM

TECHNICAL FIELD

Embodiments herein generally relate to a method for handling Transmission Time Interval (TTI) bundling in a radio communication system, a network node configured for handling TTI bundling and a corresponding computer program.

BACKGROUND

Cellular communication networks evolve towards higher data rates, together with improved capacity and coverage.

In this context, TTI bundling is an advanced technique to improve uplink coverage, and especially at the cell edge and/or at poor radio conditions.

FIG. 1 is a schematic diagram illustrating an example of a base station 10 and associated User Equipment (UE) 20 in a radio communication system. The UE 20 is generally power-limited, and when the radio conditions are not optimal and path loss is high, there is a significant risk for packet errors and/or packet losses.

TTI bundling, which is also referred to as subframe bundling, involves uplink transmission of a packet multiple times in consecutive TTI intervals, also referred to as subframes, without waiting for any transmission acknowledgement (ACK/NACK) feedback. This improves the chances of successful uplink transmission from User Equipment, especially power limited UEs.

Long Term Evolution (LTE) systems, for example, performs resource allocation to UEs adaptively by the concept of fast scheduling, normally taking into account the instantaneous traffic pattern and radio propagation characteristics of each UE. Assigning resources in both downlink (DL) and uplink (UL) is performed in the scheduler situated in the eNodeB (eNB).

In LTE, as an example, packets are delivered using the Internet Protocol (IP). This means that also traditionally circuit switched services such as voice conversation will make use of fast scheduling. This is called Voice over IP (VoIP). 3GPP has standardized a mechanism called TTI Bundling, also called "subframe bundling" in some 3GPP specifications, specifically for UE's using VoIP while they are limited by their transmission power to the extent that they need to segment their IP packets several times. When this mechanism is used the whole packet is sent four times in consecutive TTIs. This effectively increases the transmitted power used four times. It is not favorable to let UEs that do not segment their packets use TTI Bundling because for these UEs TTI Bundling causes a four times increased Uplink Shared Channel (UL-SCH) usage. Thus, in realistic scenario's there will be a mixture of UEs using TTI Bundling and UEs not using TTI Bundling. The mechanism that determines which UEs shall be configured for TTI Bundling and which UEs shall operate with normal Hybrid Automatic Repeat reQuest (HARQ) operation is a crucial part of the TTI Bundling implementation.

The drawbacks of not using TTI Bundling while this is beneficial are:
Reduced VoIP quality.
Inefficient usage of UL-SCH and control channel resources.

The drawbacks of configuring a UE for TTI Bundling while this is not necessary are:
Inefficient UL-shared channel (SCH) usage: More UL-SCH resources are used than required.
Inefficient usage of processing resources in the eNB as well as resources on the air interface due to the Radio Resource Configuration (RRC) reconfiguration that is required to enable/disable TTI Bundling.
Increased interference due to the usage of TTI Bundling.
It is thus desirable to find an efficient way of determining whether TTI bundling should be enabled or disabled for the UE(s).

SUMMARY

The proposed technology overcomes these and other drawbacks of the prior art arrangements.

It is a general object to provide a method and corresponding network node for handling TTI bundling in a radio communication system In particular, it is desirable to provide an efficient mechanism for determining whether TTI bundling should be enabled or disabled for the UE(s).

These and other objects are met by embodiments defined herein.

According to a first aspect there is provided a method for handling Transmission Time Interval, TTI, bundling in a radio communication system. The method comprises the steps of:
  obtaining frequency-selective channel quality information for at least one User Equipment, UE; and
  determining whether TTI bundling should be enabled or disabled for the UE(s) based on the frequency-selective channel quality information.

The notation 'UE(s)' should be interpreted as one or more UEs, i.e. at least one UE.

According to a second aspect there is provided a network node configured for handling Transmission Time Interval, TTI, bundling in a radio communication system. The network node comprises:
  a memory configured to store frequency-selective channel quality information for at least one User Equipment, UE; and
  processing circuitry configured to determine whether TTI bundling should be enabled or disabled for the UE(s) based on the frequency-selective channel quality information.

The network node may for example be a radio base station.

According to a third aspect there is provided, a computer program comprising program code which when executed by processing circuitry causes the processing circuitry to:
  manage frequency-selective channel quality information for at least one User Equipment, UE; and
  determine whether TTI bundling should be enabled or disabled for the UE(s) based on the frequency-selective channel quality information.

By using frequency-selective channel quality information, more accurate decisions of whether TTI bundling should be enabled or disabled can be made. In this way, TTI bundling will be used when beneficial, thus leading to more efficient resource utilization.

Other advantages will be appreciated when reading the detailed description.

BRIEF DESCRIPTION OF THE DRAWINGS

The proposed technology, together with further objects and advantages thereof, may best be understood by making reference to the following description taken together with the accompanying drawings, in which:

FIGS. 4A-C are schematic diagrams illustrating an example of a frequency-selective Signal-to-Interference-plus-Noise Ratio (SINR) curve of a given UE at three different time instants.

DETAILED DESCRIPTION

Throughout the drawings, the same reference numbers are used for similar or corresponding elements.

For a better understanding of the embodiments it may be useful to begin by explaining briefly an example of the allocation of resources in frequency and time in a radio communication according to an embodiment.

Figure 1:
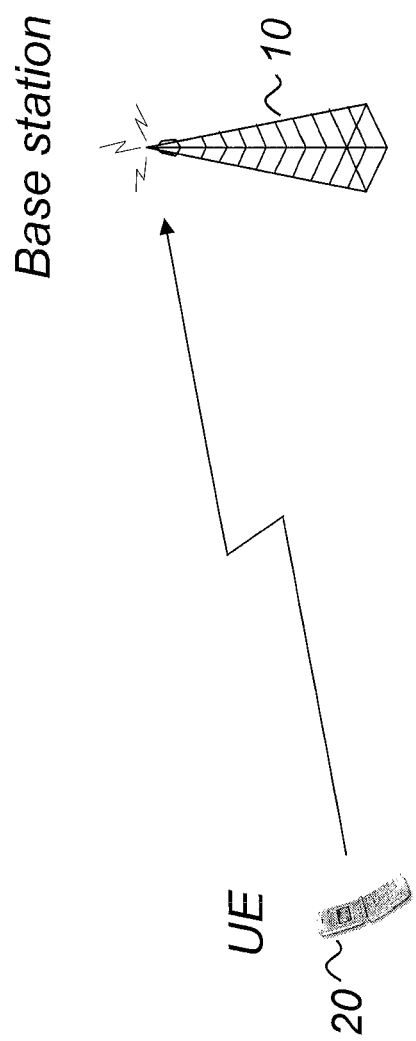
FIG. 1 is a schematic diagram illustrating an example of a base station 10 and associated User Equipment (UE) 20 in a radio communication system.
Figure 2:
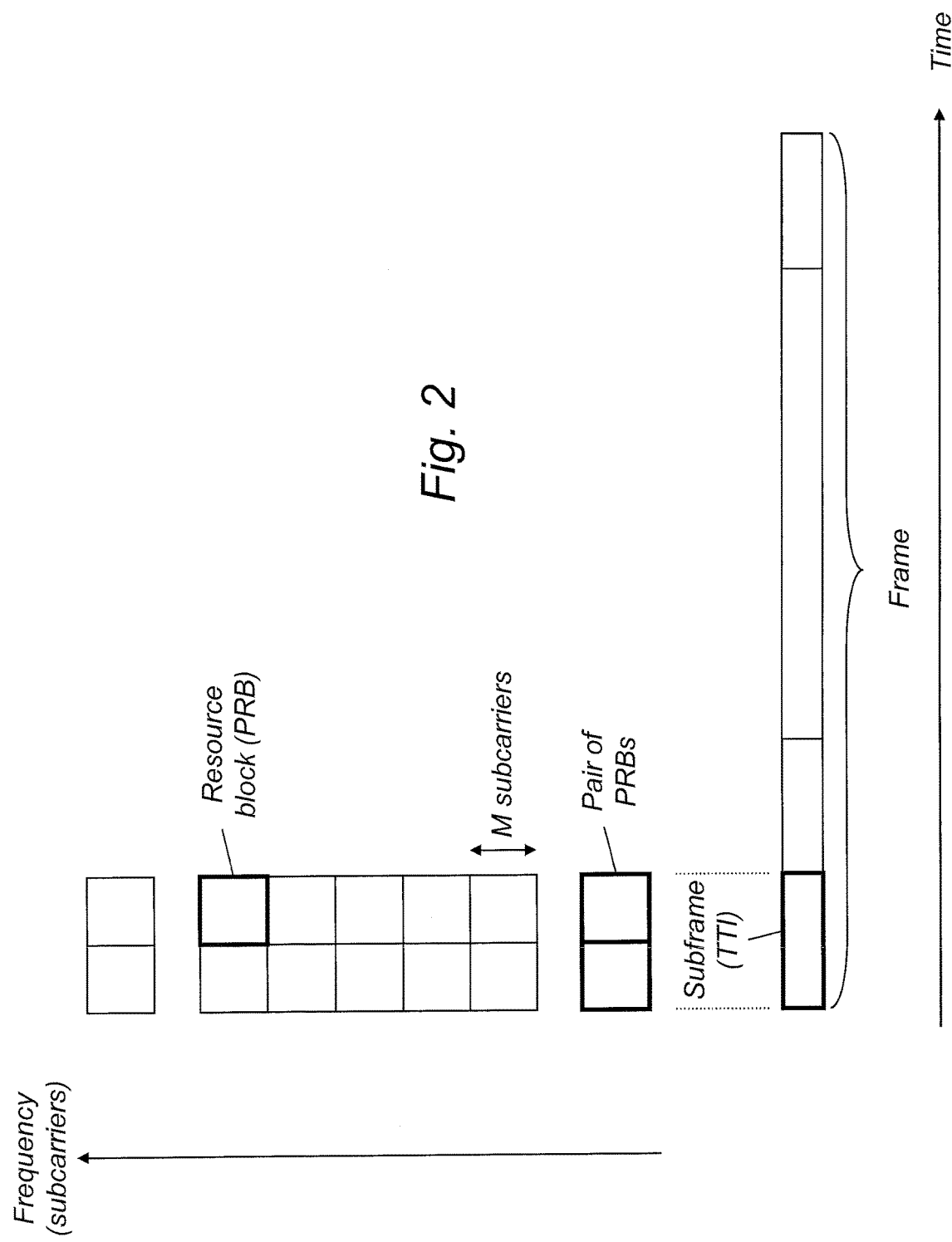
FIG. 2 is a schematic time-frequency diagram illustrating an example of the structure of the time-frequency resources for radio transmission.

FIG. 2 is a schematic time-frequency diagram illustrating an example of the structure of the time-frequency resources for radio transmission. In the time-domain, a frame includes a number of subframes, and a subframe may optionally include one or more time slots. A subframe corresponds to a Transmission Time Interval (TTI). A resource block, also referred to as a Physical Resource Block (PRB), may for example include a number M of subcarriers in the frequency domain. The resource blocks are distributed in the frequency domain over a predetermined bandwidth. In the time domain, resource blocks are normally assigned in pairs per subframe.

For the specific example of Long Term Evolution, LTE, one frame is 10 ms and includes 10 subframes. One subframe is 1 ms and includes 2 slots. One slot is 0.5 ms in the time domain and each slot can be assigned N resource blocks, 6<N<100, depending on bandwidth allocation and resource availability. One resource block is 0.5 ms and includes 12 subcarriers for each OFDM symbol in the frequency domain. There are 7 symbols (normal cyclic prefix) per time slot in the time domain or 6 symbols in long cyclic prefix.

It should though be understood that the proposed technology is not limited to the particular example of LTE, but may be useful in a wide variety of radio communication systems having time-frequency resources for the air interface.

As pointed out before it is crucial for TTI Bundling to determine which UEs shall use TTI Bundling and which UEs shall use normal HARQ operation. In the prior art, the existing solution is based on the average channel quality, SINR, of the total bandwidth. The conventional switching algorithm for when to enable/disable TTI bundling uses a threshold for this averaged wideband SINR. When the wideband SINR variable is below a certain threshold, TTI bundling is deemed beneficial and is thus enabled or activated.

Typically, a wideband SINR per UE is calculated that represents the average SINR over all PRBs for a certain time instant (this means that frequency selectivity of the channel is not taken into account due to the frequency-domain averaging). This wideband SINR is then averaged over several observations in time and an average value (over both time and frequency domains) is obtained. If this value is above a certain threshold, TTI bundling is not configured. Otherwise, TTI bundling is configured for that UE.

However, the inventors have recognized that this prior art approach is far from optimal. As realized by the inventors, the state-of-the-art method does not take into account that some of the UE's PRBs may in fact have a good enough quality to avoid using TTI bundling, even though the UE's average wideband SINR is low enough to trigger the activation of TTI bundling. Such shortcoming would result in unnecessarily turning on TTI bundling thus wasting time-frequency resources and creating constraints for the scheduler in general.

A careful analysis reveals that the prior art solution has some severe limitations:

When using wideband SINR, the decision to activate TTI bundling might be based on PRBs that the UE will not be scheduled over. Especially when frequency selective information is used to schedule the UE (e.g. using Frequency Selective Scheduling, FSS) it may be scheduled on resources that provide better radio conditions than the average radio conditions.

Another drawback of using wideband SINR is that the average value could be dragged down by a few fading dips, which will not be used eventually when allocating PRBs to that user anyway.

A further implicit limitation is that the current prior art solution represents an FSS-unaware scheme for activating TTI bundling.

Example: During a period of relative low load it is possible to schedule UEs on the resources that provide better radio conditions than the average radio condition. Using wideband average SINR it may be determined that the UEs shall be configured for TTI Bundling. However, TTI Bundling does not provide extra VoIP performance for these UEs. As a result an RRC Reconfiguration is performed, leading to usage of resources in the eNB, air interface and UE while this is not really necessary. After the RRC Reconfiguration, more UL-SCH resources are used than necessary, which in turn reduces the cell capacity.

Example: UEs using TTI Bundling are scheduled at resources with increasingly better radio conditions while the changes in average radio conditions are less pronounced. These UEs do not need TTI Bundling but will continue to use TTI Bundling if average channel conditions are used.

In summary, adaptive enabling-disabling of TTI bundling per UE is crucial for efficient resource utilization. However, in the prior art, the decision is based on time-filtered wideband uplink SINR values which neither consider frequency selectivity nor where a UE is scheduled in frequency. The inventors have recognized that this could lead to unnecessary activation of TTI bundling, erroneous deactivation of TTI bundling, additional signaling and less efficient resource utilization.

An idea is therefore to use frequency-selective channel quality information for determining whether TTI bundling should be enabled or disabled. Instead of using average wideband channel quality information, it may be beneficial to use the channel quality information of the actual resources (to be) allocated to the UE, to determine if TTI Bundling shall be used by the UE or not.

Figure 3:
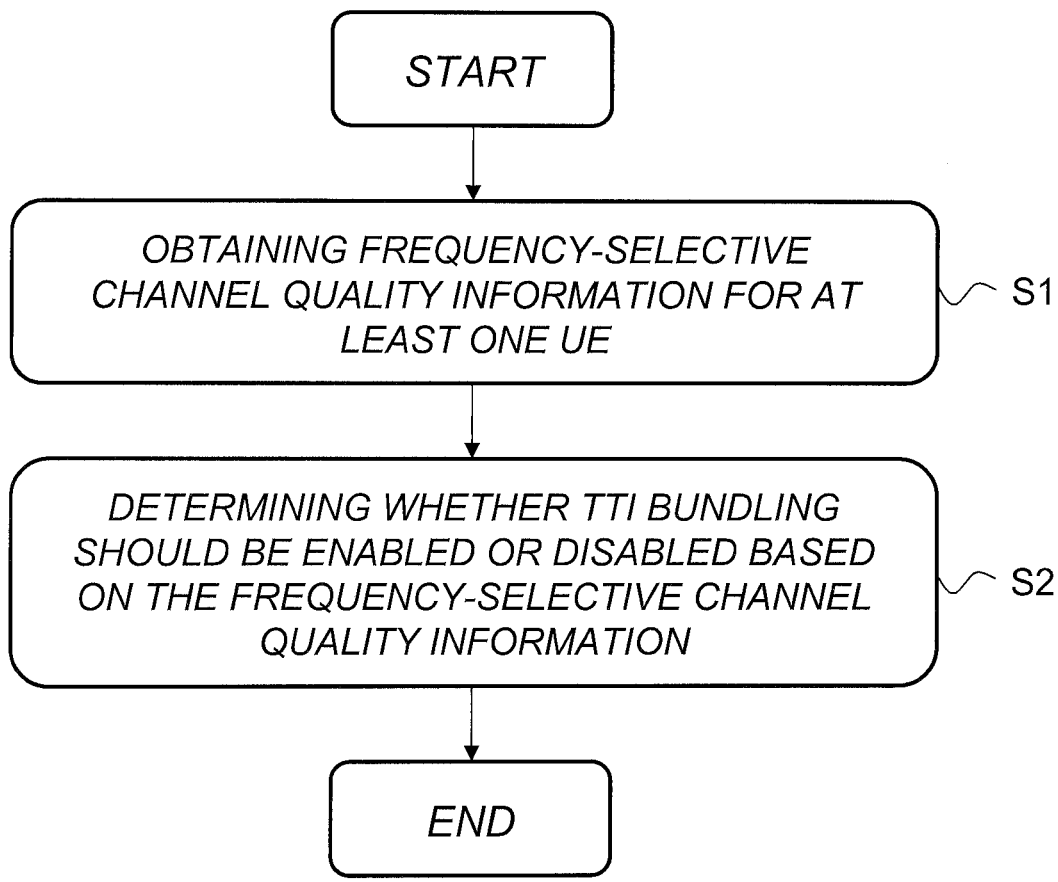
FIG. 3 is a schematic flow diagram illustrating an example of a method for handling TTI bundling in a radio communication system according to an embodiment.

FIG. 3 is a schematic flow diagram illustrating an example of a method for handling TTI bundling in a radio communication system according to an embodiment.

Step S1 involves obtaining frequency-selective channel quality information for at least one User Equipment (UE).

Step S2 involves determining whether TTI bundling should be enabled or disabled for the UE(s) based on the frequency-selective channel quality information.

By using frequency-selective channel quality information, more accurate decisions of whether TTI bundling should be enabled or disabled can be made. TTI bundling may thus be enabled or disabled for the UE(s) in dependence on the outcome of the determining step S2. In this way, TTI bundling will be used only when beneficial, thus leading to more efficient resource utilization.

In other words, the network node in charge of the TTI bundling decision preserves frequency selective information about the UE in question in order to more accurately activate-deactivate TTI bundling. As such, instead of performing a frequency-domain averaging to obtain a wideband SINR per time instant, the frequency-selective SINRs are preserved, possibly averaged in the time domain only.

For example, it is possible to reuse existing sounding reference signal (SRS) measurements. Although the SRS capacity might sometimes be low due to layer-1 processing, this shouldn't be a limitation in practice as it is not crucial to have frequent SRS measurements for the purpose of the proposed technology.

Another way of obtaining the frequency-selective information is through reusing the existing interference and noise measurements, and then complement them with e.g. the UE path loss in order to obtain some form of frequency selective SINR.

It should also be understood that SINR is merely an example of a channel quality measure. In general, other measures, in combination with or instead of SINR, can also be used if desired.

The following terms are used interchangeably with the meaning of enabling TTI bundling: 'activating', 'configuring' and 'using' TTI bundling. The following terms are used interchangeably with the meaning of disabling TTI bundling: 'deactivating', 'not configuring' and 'not using' TTI bundling.

FIGS. 4A-C are schematic diagrams illustrating an example of a frequency-selective Signal-to-Interference-plus-Noise Ratio (SINR) curve of a given UE at three different time instants. It should though be understood that the embodiments are not limited to SINR, but any conventional channel quality measure can be used, including Signal-to-Noise Ratio (SNR), Carrier-to-Noise-Ratio (CIR) and any other related quality measure.

It can be seen from the curve diagrams of FIG. 4A-C that the channel quality varies with frequency, e.g. in dependence on the PRB index as illustrated. Instead of performing frequency-domain averaging to obtain a wideband SINR value per time instant, it is proposed to preserve the frequency-selective channel quality information and use it for the TTI bundling decision.

Although any of the curves depicted in FIGS. 4A-C can be used on its own merits for providing frequency-selective channel quality information, it may be useful to provide time-filtered frequency-selective channel quality information.

By way of example, the frequency-selective SINRs or similar quality measure over different time instants may be averaged in the time domain. This means that the SINR or similar quality measure used for deciding whether TTI bundling should be activated or not is based on time domain averaging only, thus maintaining its frequency selectivity. Many different types of averaging may be used, including weighted averaging and/or moving average techniques.

Figure 5:
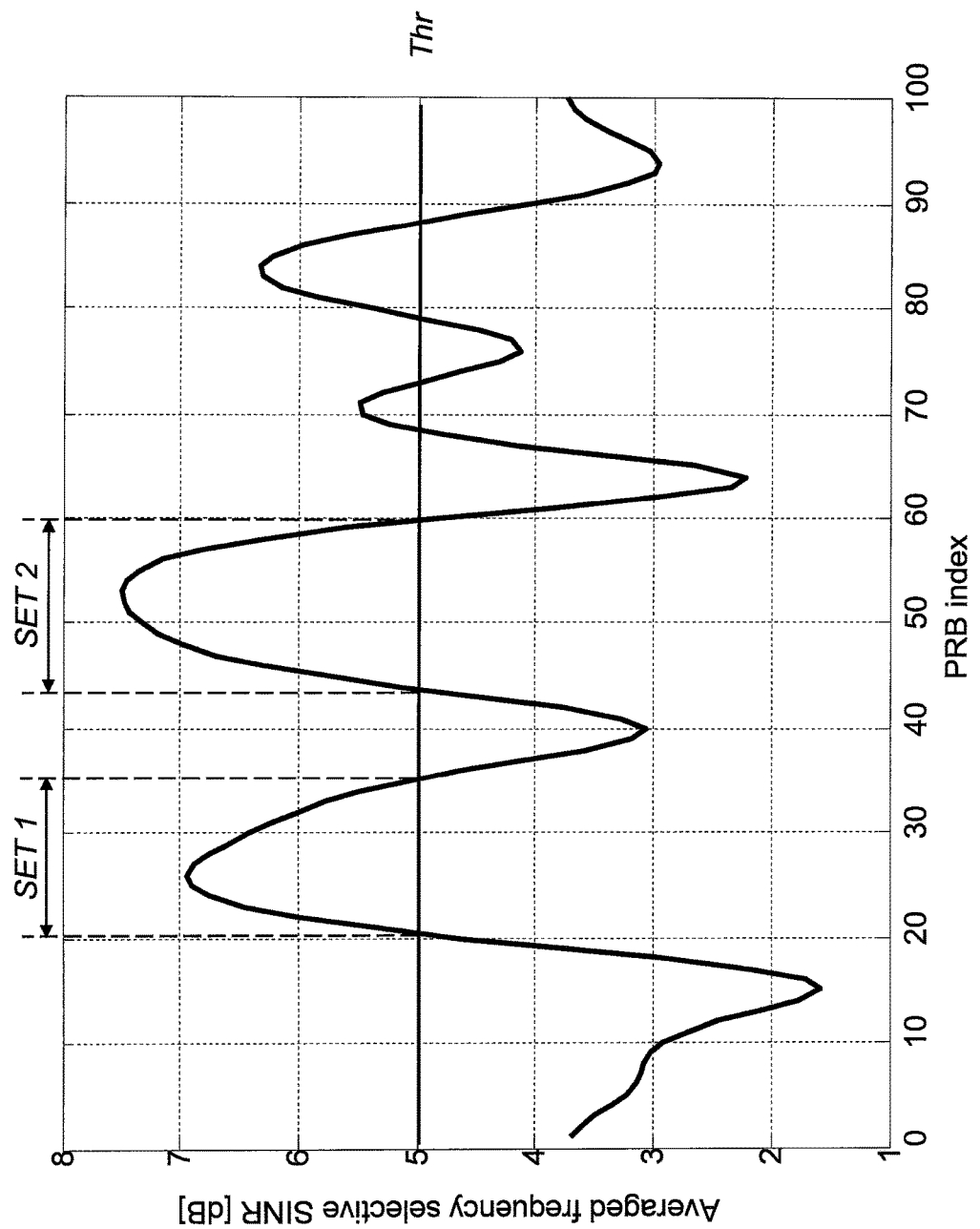
FIG. 5 is a schematic diagram illustrating an example of a time-averaged frequency-selective SINR curve obtained by averaging the frequency-selective SINR curves of FIGS. 4A-C.

FIG. 5 is a schematic diagram illustrating an example of a time-filtered frequency-selective SINR curve obtained by averaging the frequency-selective SINR curves of FIGS. 4A-C.

In other words, the SINR of PRB with index k (in the SINR used for evaluation of TTI bundling usage) is equal to the average SINR of PRB 'k' over several different time instants. By averaging the frequency selective SINR over the three different time instants, a time-averaged frequency selective SINR is obtained as shown in FIG. 5. This SINR will be used (possibly with some ping-pong protection) as an input for the decision of activating/deactivating TTI bundling for a given UE.

As understood from the curve diagrams of FIGS. 4A-C and FIG. 5, it can be seen that the frequency-selective channel quality information may include channel quality information, such as SINR or time-averaged SINR, for each of a number of Physical Resource Blocks, PRBs.

A typical allocation for small packets transferred by e.g. VoIP applications is often only a small part of the total bandwidth. For a bandwidth of 20 MHz almost 100 Physical Resource Blocks (PRB) are available. Allocations for VoIP are most often not larger than 5 PRBs, especially for power limited UEs which are candidates for the usage of TTI Bundling. In the current 3GPP specifications, TTI Bundling users are in fact restricted to use a maximum of 3 PRBs.

It is thus possible to determine whether TTI bundling should be enabled or disabled by investigating whether there is a set of PRBs satisfying a threshold quality.

Figure 6:
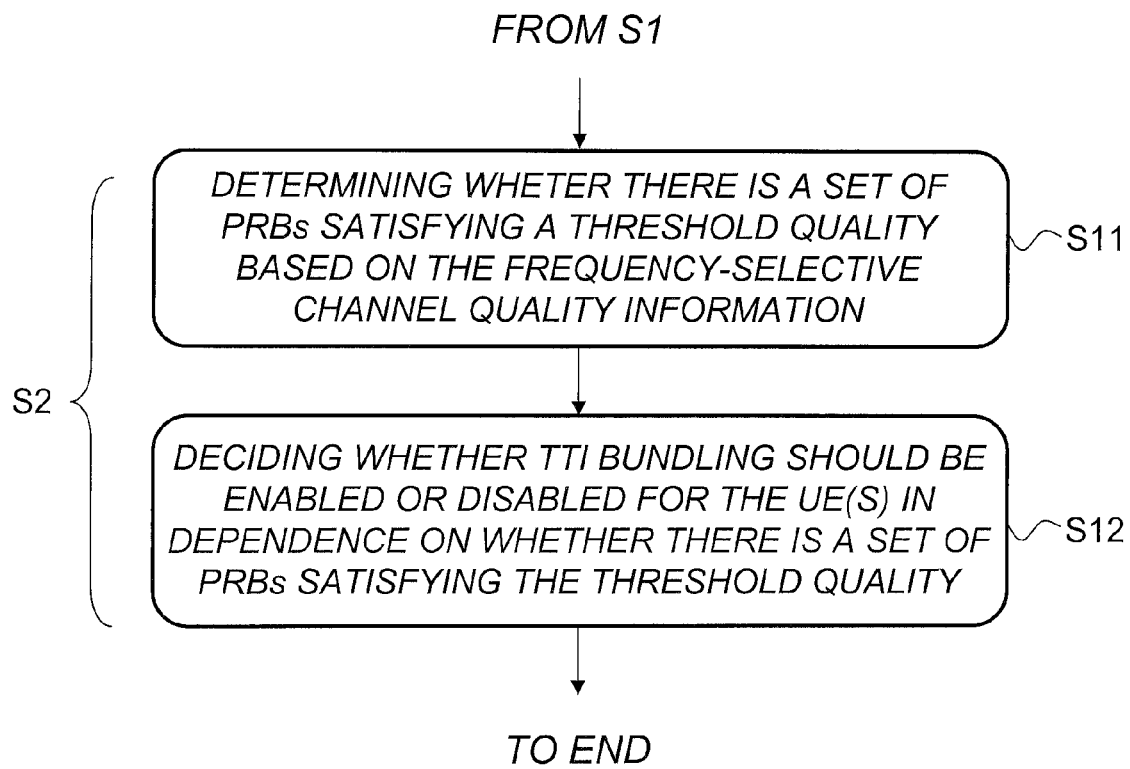
FIG. 6 is a schematic flow diagram illustrating a particular example of the step of determining whether TTI bundling should be enabled or disabled according to an embodiment.

FIG. 6 is a schematic flow diagram illustrating a particular example of the step of determining whether TTI bundling should be enabled or disabled according to an embodiment.

Step S11 involves determining whether there is a set of PRBs satisfying a threshold quality based on the frequency-selective channel quality information.

Step S12 involves deciding whether TTI bundling should be enabled or disabled for the UE(s) in dependence on whether there is a set of PRBs satisfying the threshold quality.

The threshold quality may be set in a wide variety of ways, e.g. by the network operator in dependence on knowledge about the network including various parameters such as load and path loss.

With reference to FIG. 5 once again, it can be seen that there are two major sets, SET 1 and SET 2, of PRBs that have a quality measure above a predetermined threshold Thr.

By way of example, TTI bundling is disabled for the UE(s) if there is a set of PRBs satisfying the threshold quality, and TTI bundling is enabled for the UE(s) if there is not a set of PRBs satisfying the threshold quality.

Preferably, if TTI bundling is disabled, at least part of the set of PRBs satisfying the threshold quality is allocated to the UE(s). For example, this means that it may be beneficial to allocate PRBs from SET 1 and/or SET 2 of FIG. 5.

Another case of practical interest is when there are multiple UEs to schedule per TTI.

Figure 7:
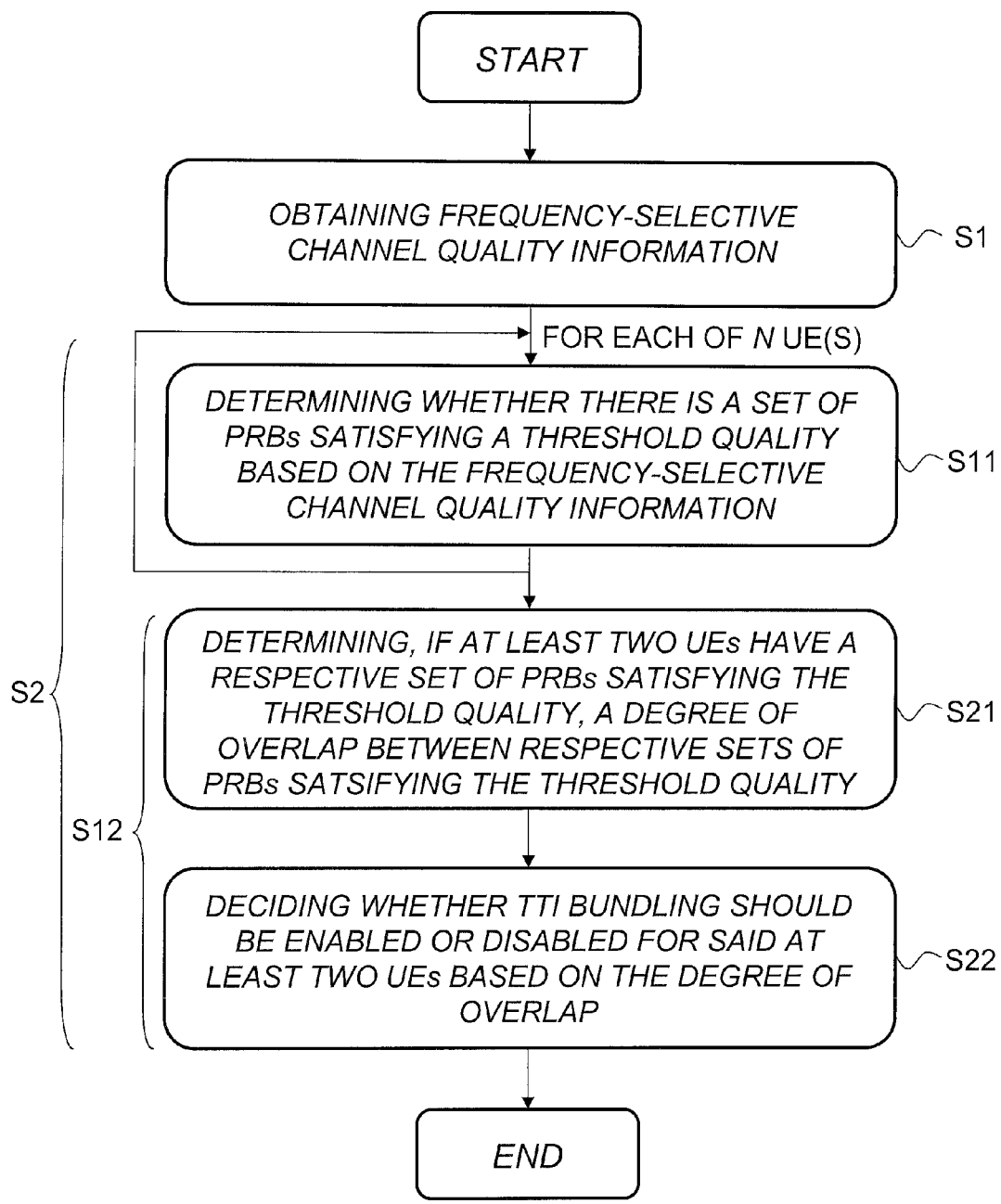
FIG. 7 is a schematic flow diagram illustrating an example of a method for handling TTI bundling for multiple UEs scheduled within the same TTI according to an embodiment.

FIG. 7 is a schematic flow diagram illustrating an example of a method for handling TTI bundling for multiple UEs scheduled within the same TTI according to an embodiment.

Step S1 involves obtaining frequency-selective channel quality information for at least one User Equipment (UE).

Step S11 involves determining, for each of a number N of UEs scheduled within the same TTI, where N≥2, whether there is a set of PRBs satisfying a threshold quality based on the frequency-selective channel quality information.

Step S21 involves determining, if at least two of the N UEs have a respective set of PRBs satisfying the threshold quality, a degree of overlap between respective sets of PRBs satisfying the given threshold quality.

Step S22 involves deciding whether TTI bundling should be enabled or disabled for the at least two UEs based on the degree of overlap.

As indicated in FIG. 7, steps S21 and S22 are part of step S12, and steps S11 and S12 are part of step S2.

Normally, TTI bundling is disabled for the at least two UEs if there is a degree of overlap that is lower than a threshold. This threshold is also referred to as an overlap threshold to distinguish it from the previously described threshold quality Thr.

For ease of illustration, this aspect will now be described with reference to an example case of N=2 users without loss of generality.

Figure 8:
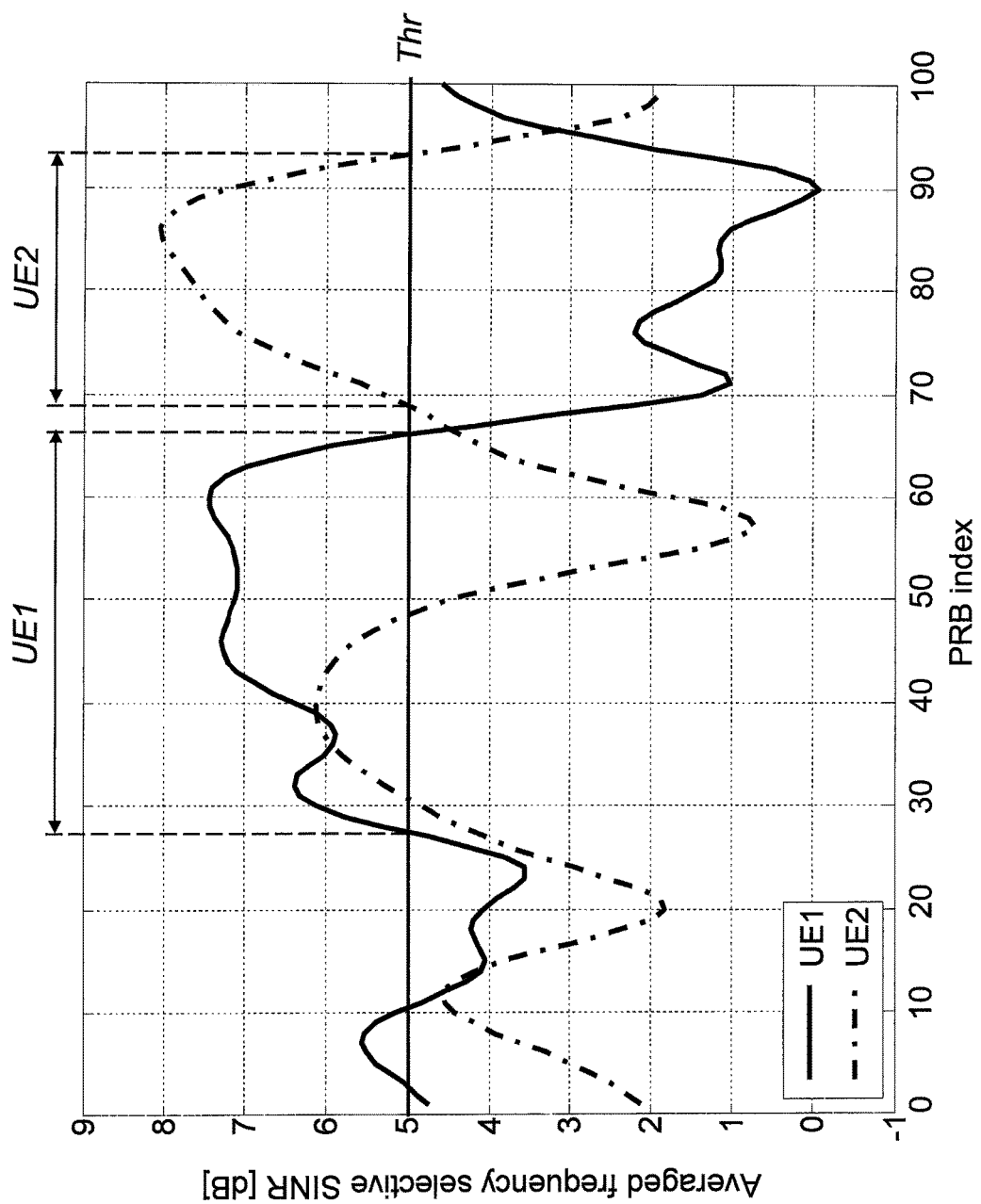
FIG. 8 is a schematic diagram illustrating an example of time-averaged frequency-selective SINR curves for two different UEs.

FIG. 8 is a schematic diagram illustrating an example of time-averaged frequency-selective SINR curves for two different UEs.

First, (time-averaged) frequency selective channel quality information such as frequency-selective SINR, is obtained per UE, as illustrated in FIG. 8.

By way of example, the number of PRBs needed per UE is determined based on a threshold quality and optionally also the amount of data in the UE's buffer What is needed in addition to the method above is to check whether the two UEs have their (best/desired) PRBs overlapping. If the two UEs have non-overlapping PRBs that satisfy the required PRBs, then no TTI bundling is activated. Alternatively one can allow for some overlapping of the two UEs' (best/desired) PRBs without the need to activate TTI bundling in order to account for time-domain averaging. One way to do so is to compute a correlation value for the overlap between the respective sets of PRB allocations of the two users and compare this value to some pre-determined threshold. Any other way of analyzing the degree of overlap can alternatively be used.

In the particular example of FIG. 8, the two UEs have their respective sets of PRBs well distinct. It can be seen that it is possible to find a set of PRBs above the threshold quality Thr for UE1 (PRBs with index k within the interval 27-66) that is not overlapping with another set of PRBs above the threshold quality Thr for UE2 (PRBs with index k within the interval 69-93).

The degree of overlap between these sets is zero, and hence TTI bundling is preferably disabled. Preferably, at least part (preferably the best; i.e. highest channel quality) of the PRBs with index k between 27-66 are allocated to UE1, and at least part (preferably the best; i.e. highest channel quality) of the PRBs with index k between 69-93 are allocated to UE2.

Referring to FIG. 6 or FIG. 7, the previously described step S11 of determining whether there is a set of PRBs satisfying a threshold quality may as an example be based on determining whether there is at least a number, $K_i$ of contiguous or non-contiguous PRBs satisfying the threshold quality.

In the current standard specifications, contiguous resource block allocation is required, but future standard developments may allow non-contiguous resource block allocation in the frequency domain.

For example, TTI bundling may be disabled for a UE if there is a set of at least $K_i$ contiguous PRBs satisfying the threshold quality, and TTI bundling may be enabled for a UE if there is not a set of at least $K_i$ contiguous PRBs satisfying the threshold quality.

Preferably, the number K is set per UE i and representative of an expected number of PRBs to be allocated to the UE given a certain channel quality and/or amount of data in the UE buffer.

As briefly indicated above, it is possible to also use information regarding the amount of data in the UE buffer (equivalently the amount of data of the Logical Channel Group) as a basis for the TTI bundling decision. Using the amount of data in the UE buffer and the frequency selective channel quality, such as SINR, it is possible to determine an expected number of PRBs needed to be allocated to that UE. Note that since TTI bundling is used in UL only, the PRBs are normally required to be contiguous, which in fact makes it simpler (due to much fewer possible combinations) to compute the number of PRBs needed given a certain channel quality and amount of data. Additionally the number of combinations may be limited because at most 3 PRBs can be allocated when TTI Bundling is used, as currently specified by 3GPP. If the UE has in fact enough PRBs that are above the threshold for turning on TTI bundling, then there would be no need to activate TTI bundling even if the UE's average SINR (in time and frequency) is below that threshold.

Note that this approach might not be necessary for all UEs. For instance, UEs that have very high channel quality, such as SINR, compared to a certain threshold need not be evaluated using this approach and are assumed to not need TTI bundling. This processing would in fact result in reducing complexity.

Based on whether TTI bundling is activated or not, the PRB allocation for a UE can be adjusted and optimized. In other words, a TTI bundling-aware PRB allocation is advocated.

Figure 9:
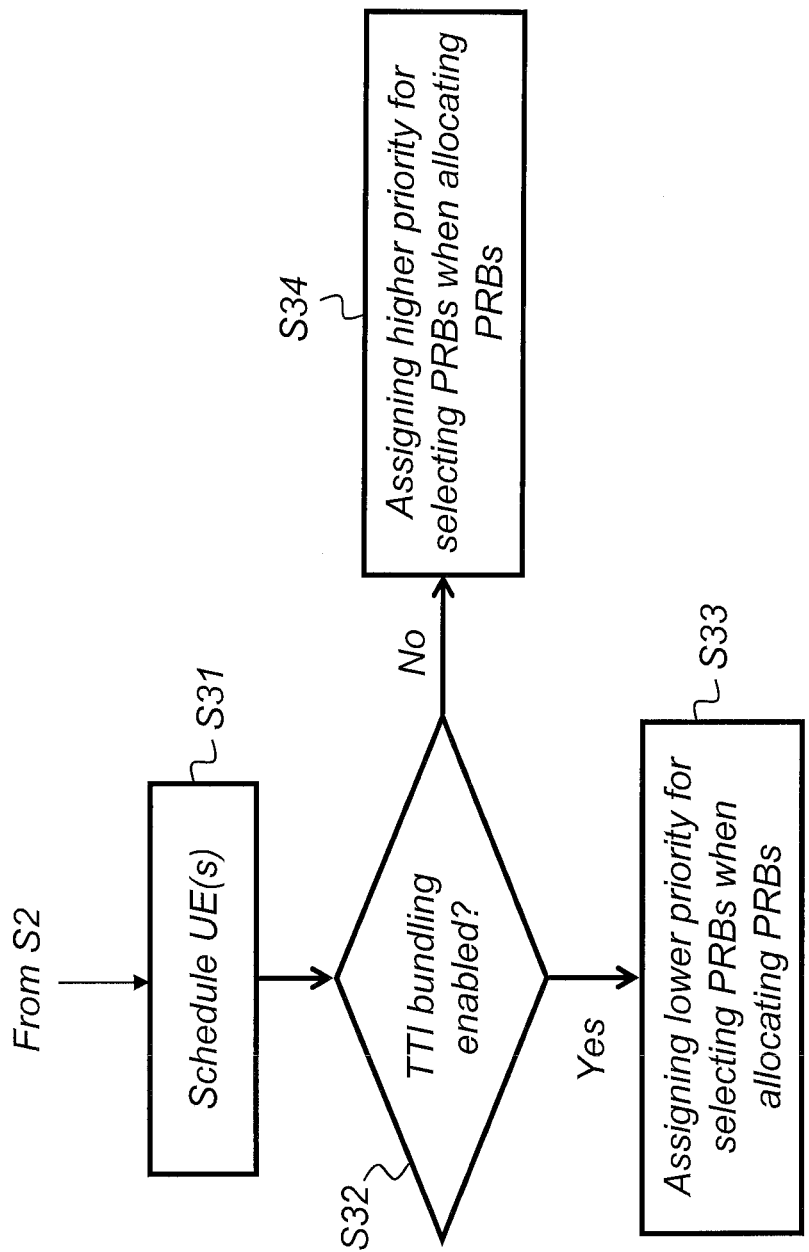
FIG. 9 is a schematic flow diagram illustrating an example of method steps for assigning priority to a UE for selecting Physical Resource Blocks (PRBs) when allocating PRBs according to an embodiment.

FIG. 9 is a schematic flow diagram illustrating an example of method steps for assigning priority to a UE for selecting PRBs when allocating Physical Resource Blocks, PRBs according to an embodiment.

Step S31 involves scheduling the UE(s) for uplink communication.

Step S32 involves checking whether TTI bundling is enabled for the UE(s).

Step S33 involves assigning, to a UE for which TTI bundling is enabled (YES), lower priority for selecting PRBs than non-bundling UEs when allocating Physical Resource Blocks, PRBs.

Step S34 involves assigning, to a UE for which TTI bundling is not enabled (NO), higher priority for selecting PRBs than bundling UEs when allocating PRBs.

For instance, in case TTI bundling is used (YES), the UE needs not be allocated its best PRBs using Frequency Selective Scheduling. That is because the TTI bundling UEs will anyway benefit from time diversity and combining gains. Instead, other UEs are first allocated their best or preferred PRBs, and the TTI bundling UE would get its PRBs last. As such other UEs that are more in need of diversity can benefit from it. One further advantage is that such approach will cause less spectrum fragmentation.

On the other hand, in case TTI bundling is not used (NO) then it may be beneficial for the UE to have access to its best or preferred PRBs before other UEs. The UE could be given a weight bonus if needed.

Now whether the UE's best or otherwise preferred PRBs are above or below the bundling threshold, different actions may be taken, as discussed below.

Figure 10:
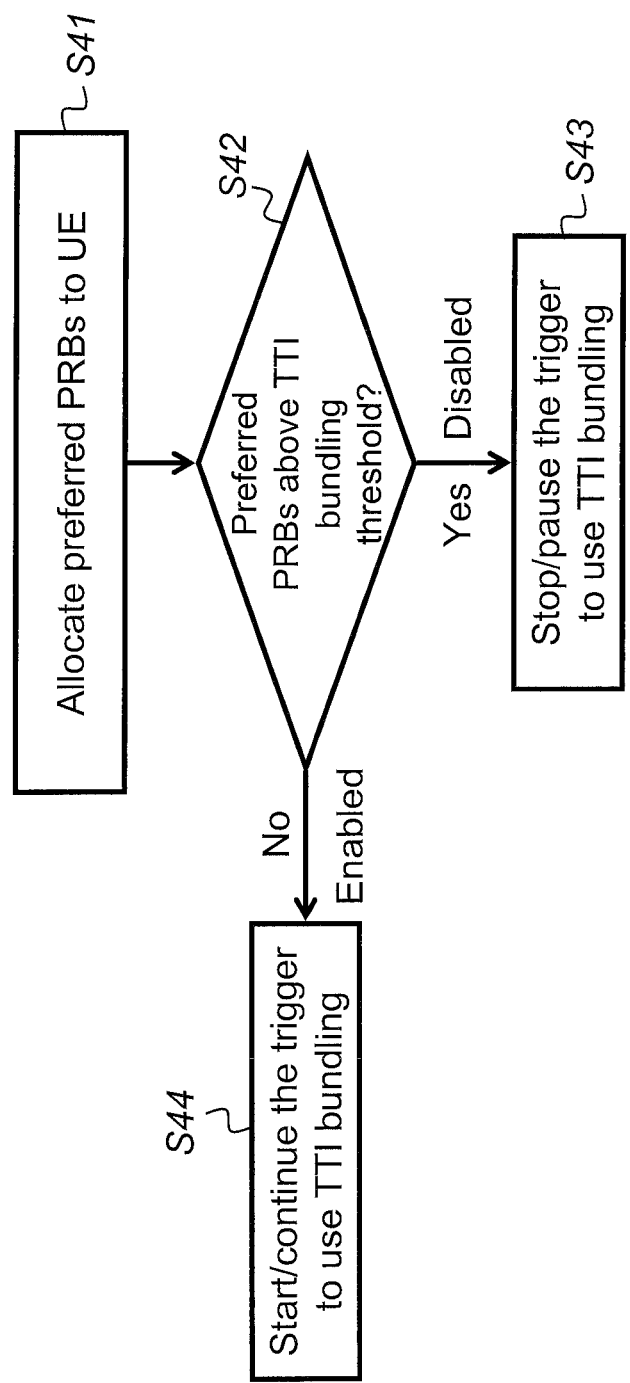
FIG. 10 is a schematic flow diagram illustrating a usage example of selectively enabling/disabling the use of TTI bundling.

FIG. 10 is a schematic flow diagram illustrating a usage example of selectively enabling/disabling the use of TTI bundling.

Step S41 involves allocating preferred PRBs to a UE.

Step S42 involves checking whether preferred PRBs are above a TTI bundling threshold.

Step S43 (YES) involves stopping/pausing the trigger to use TTI bundling. TTI bundling 'Disabled'.

Step S44 (NO) involves starting/continuing the trigger to use TTI bundling. TTI bundling 'Enabled'.

Even if a UE is allocated its best or preferred PRBs, there is no guarantee that these PRBs have a good enough quality to avoid the usage of TTI bundling.

Taking this aspect into account is important in order to:
Trigger TTI bundling when it is really needed.
Avoid triggering TTI bundling when it is not really needed.

For instance, if the UE's allocated preferred PRBs are above the bundling threshold, then TTI bundling isn't needed. As such, one can stop or pause any existing trigger for using TTI bundling for that UE.

For example, if there is condition that TTI bundling is turned ON if the UE has its best PRBs below the threshold for X ms, then every time the UE has its best PRBs above the threshold, the timer is paused or reset.

In other words, a temporal hysteresis may be applied for allowing a change between enabled and disabled TTI bundling only when a predetermined period of time has elapsed since the last change between enabled and disabled TTI bundling.

Alternatively, if the UE's allocated best or preferred PRBs are below the bundling threshold, then TTI bundling is in fact needed. As such, one should start/resume/continue the trigger for using TTI bundling for that UE.

The triggers mentioned above are typically used to avoid a ping pong behavior for switching on-off TTI bundling.

Figure 11:
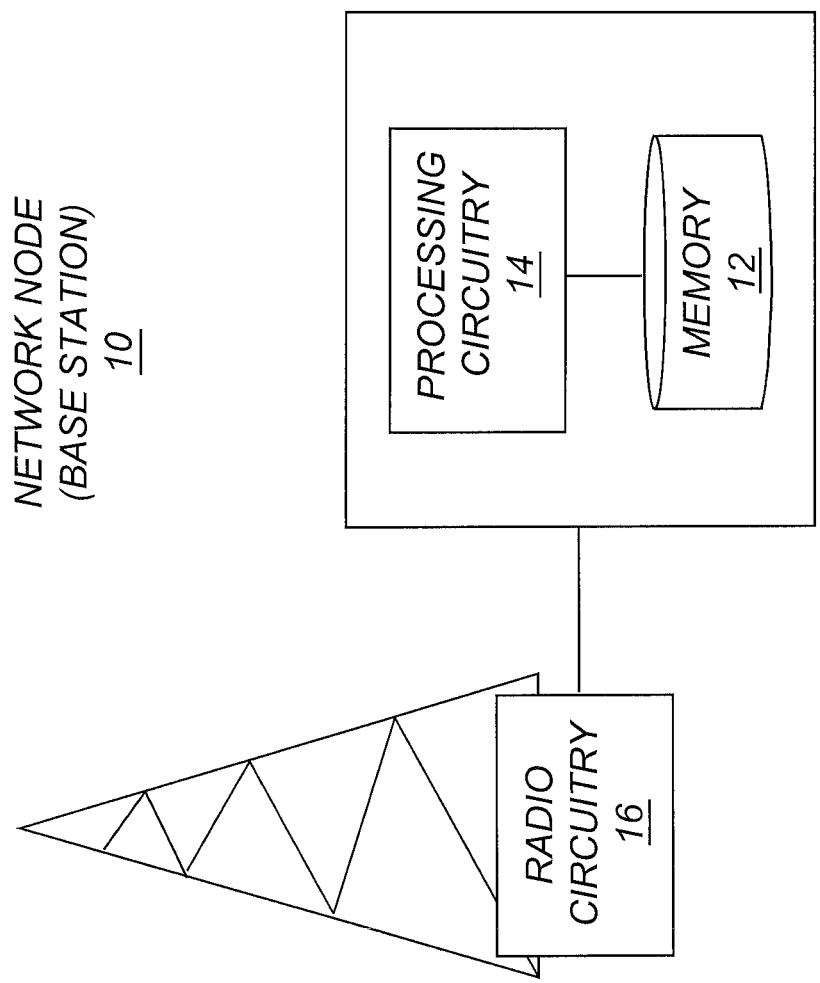
FIG. 11 is a schematic block diagram illustrating an example of a network node according to an embodiment.

FIG. 11 is a schematic block diagram illustrating an example of a network node according to an embodiment. The network node 10 is generally configured for handling Transmission Time Interval, TTI, bundling in a radio communication system. Basically, the network node 10 comprises a memory 12 and processing circuitry 14. The memory 12 is configured to store frequency-selective channel quality information for at least one User Equipment, UE. The processing circuitry 14 is configured to determine whether TTI bundling should be enabled or disabled for the UE(s) based on the frequency-selective channel quality information.

The frequency-selective channel quality information is normally maintained per UE in the memory 12, and the TTI bundling decision is normally also taken per UE.

The network node 10 may also include radio circuitry 16 for communication with one or more other nodes, including transmitting and/or receiving information. By way of example, the processing circuitry 14 may be configured to set control information representative of whether TTI bundling should be enabled or disabled, and the radio circuitry 16 is then configured to transmit the control information to the UE(s). This may be realized as part of the RRC signaling from the network node to the UE.

For example, the memory 12 may be configured to store time-filtered frequency-selective channel quality information, and the processing circuitry 14 is configured to determine whether TTI bundling should be enabled or disabled based on this time-filtered frequency-selective channel quality information.

As an example, the memory 12 may be configured to store channel quality information for each of a number of Physical Resource Blocks, PRBs, as previously indicated. In this context, the processing circuitry 14 may be configured to determine whether there is a set of PRBs satisfying a threshold quality based on the frequency-selective channel quality information, and to decide whether TTI bundling should be enabled or disabled for the UE(s) in dependence on whether there is a set of PRBs satisfying the threshold quality.

The network node is normally configured to disable TTI bundling for the UE(s) if there is a set of PRBs satisfying the threshold quality, and to enable TTI bundling for the UE(s) if there is not a set of PRBs satisfying the threshold quality.

As previously mentioned, it is possible to reuse existing sounding reference signal (SRS) measurements and/or reuse existing interference and noise measurements, and then complement them with e.g. the UE path loss in order to obtain some form of frequency selective SINR or equivalent channel quality measure.

Figure 12:
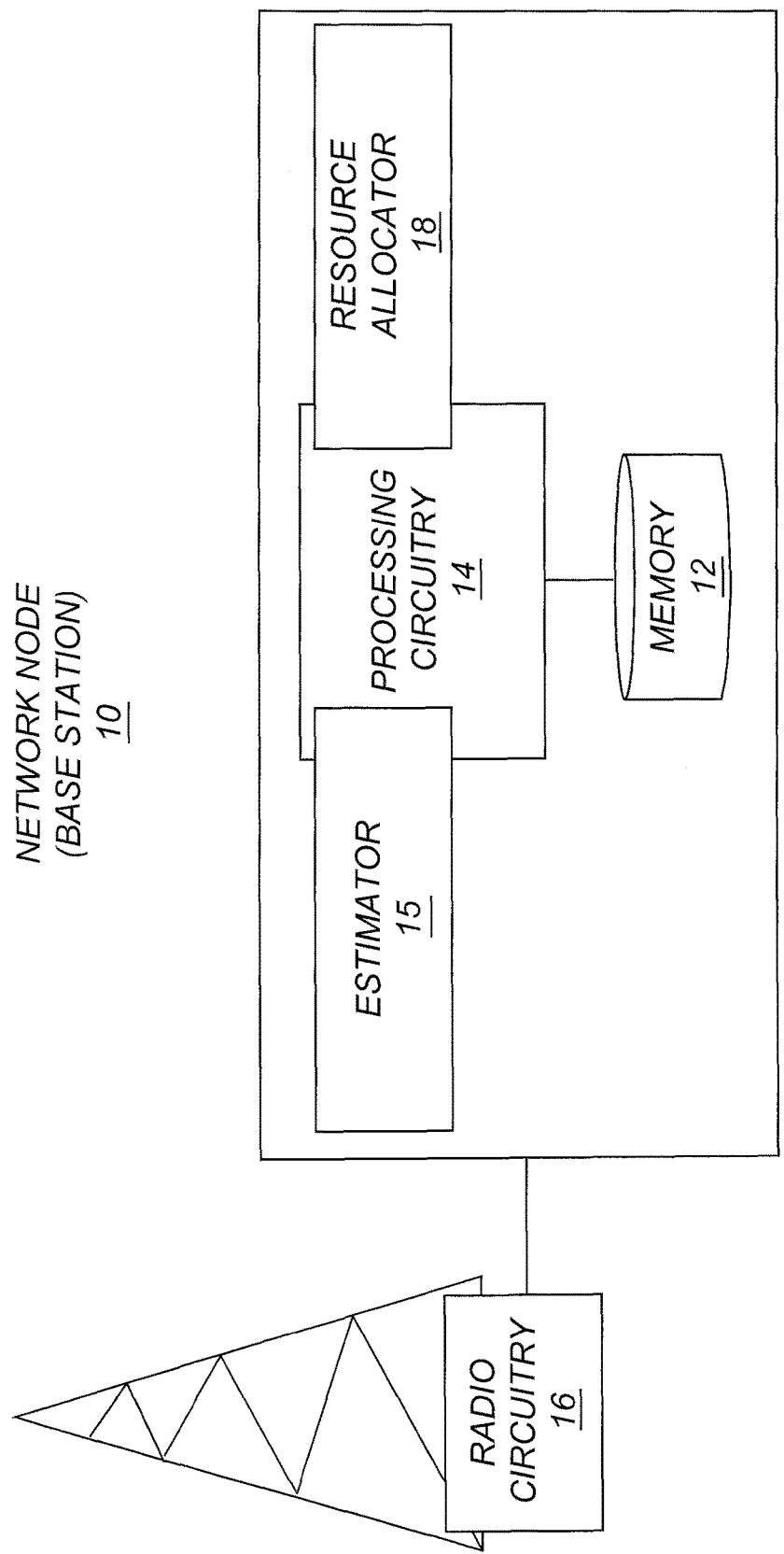
FIG. 12 is a schematic block diagram illustrating another example of a network node according to an embodiment.

As indicated in FIG. 12, the network node may additionally include an estimator configured to estimate or extract the frequency-selective channel quality information.

The network node may also comprise a resource allocator 18 configured to allocate, if TTI bundling is disabled, at least part of the set of PRBs satisfying the threshold quality to the UE(s). The resource allocator may for example be implemented as part of the scheduler in the eNodeB of an LTE implementation.

As indicated in FIG. 12, the estimator 15 and/or the resource allocator 18 may be implemented as part of the processing circuitry 14, e.g. as computer program modules for execution by the processing circuitry 14, or closely interconnected thereto.

The network node may also be configured to handle TTI bundling for multiple UEs that are scheduled within the same TTI.

By way of example, the processing circuitry 14 is configured to determine, for each of a number N of UEs scheduled within the same TTI, where N≥2, whether there is a set of PRBs satisfying a threshold quality based on the frequency-selective channel quality information. The processing circuitry 14 is also configured to decide, if at least two of the N UEs have a respective set of PRBs satisfying the threshold quality, whether TTI bundling should be enabled or disabled for these at least two UEs based on a degree of overlap between respective sets of PRBs satisfying the given threshold quality.

The network node may be configured to disable TTI bundling for these at least two UEs if there is a degree of overlap that is lower than a threshold.

For any of the above embodiments, the processing circuitry 14 may be configured to determine whether there is a set of PRBs satisfying a threshold quality based on determining whether there is at least a number, $K_i$, of contiguous or non-contiguous PRBs satisfying the threshold quality.

As a further example, the processing circuitry 14 is configured to assign, to a UE for which TTI bundling is to be used, lower priority for selecting PRBs than non-bundling UEs when allocating Physical Resource Blocks, PRBs, and to assign, to a UE for which TTI bundling is not to be used, higher priority for selecting PRBs than bundling UEs when allocating PRBs.

In a particular example, the network node is a radio base station.

It will be appreciated that the methods and devices described above can be combined and re-arranged in a variety of ways.

For example, embodiments may be implemented in hardware, or in software for execution by suitable processing circuitry.

The steps, functions, procedures and/or blocks described above may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures and/or blocks described above may be implemented in software such as a computer program for execution by suitable processing circuitry including one or more processing units. Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs) or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 13:
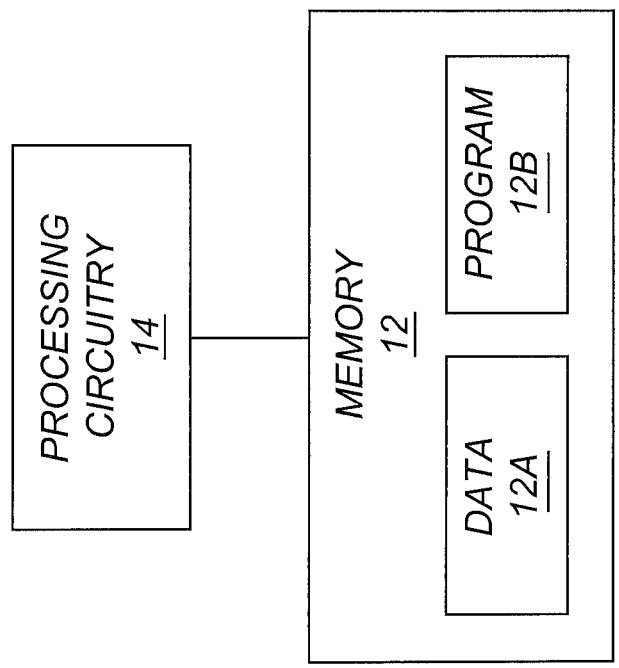
FIG. 13 is a schematic block diagram illustrating an example of a computer-implementation of a network node according to an embodiment.

In the following, an example of a computer implementation will be described with reference to FIG. 13. The network node 10 comprises processing circuitry 14 such as one or more processors and a memory 12. The memory may include a memory part 12A for data such as the frequency-selective channel quality information and any additional data, and a memory part 12B for a computer program, as will be explained below.

In this particular example, at least some of the steps, functions, procedures and/or blocks described above are implemented in a computer program, which is loaded into the memory part 12B of the memory 12 for execution by the processing circuitry 14.

The processing circuitry 14 and memory 12 are interconnected to each other to enable normal software execution. An optional input/output device (not shown) may also be interconnected to the processing circuitry 14 and/or the memory 12 to enable input and/or output of relevant data such as input parameter(s) and/or resulting output parameter(s).

The term 'computer' should be interpreted in a general sense as any system or device capable of executing program code or computer program instructions to perform a particular processing, determining or computing task.

In a particular embodiment, the computer program comprises program code which when executed by the processing circuitry 14 causes the processing circuitry to:
  manage frequency-selective channel quality information for at least one User Equipment, UE; and
  determine whether TTI bundling should be enabled or disabled for the UE(s) based on the frequency-selective channel quality information.

The software or computer program may be realized as a computer program product, which is normally carried or stored on a computer-readable medium.

The computer-readable medium may include one or more removable or non-removable memory devices including, but not limited to a Read-Only Memory (ROM), a Random Access Memory (RAM), a Compact Disc (CD), a Digital Versatile Disc (DVD), a Universal Serial Bus (USB) memory, a Hard Disk Drive (HDD) storage device, a flash memory, or any other conventional memory device. The computer program may thus be loaded into the operating memory of a computer or equivalent processing device for execution by the processing circuitry 14 thereof.

For example, the computer program stored in memory includes program instructions executable by the processing circuitry 14, whereby the processing circuitry 14 is able or operative to execute the above-described steps, functions, procedure and/or blocks.

The network node 10 is thus configured to perform, when the processing circuitry 14 thereof is executing the computer program, well-defined processing tasks such as those described above.

The computer or processing circuitry 14 does not have to be dedicated to only execute the above-described steps, functions, procedure and/or blocks, but may also execute other tasks.

Advantages of embodiments include at least one of the following:
  Allows a more accurate activation-deactivation of TTI bundling on UE level which results in more efficient resource utilization, not only for TTI bundling UEs but also for other UEs in the cell, and also reduces unnecessary signaling that comes from "faulty" activation-deactivation of TTI bundling.
  Allows TTI bundling to be used only when beneficial.
  Allows optimization of the resource allocation based on whether TTI bundling is used or not.
  Makes it possible to decrease the switching frequency between using and not using TTI bundling.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A method for handling Transmission Time Interval (TTI) bundling in a radio communication system, wherein said method comprises the step of:
obtaining frequency-selective channel quality information for at least one User Equipment (UE), wherein said frequency-selective channel quality information includes channel quality information for each of a number of Physical Resource Blocks (PRBs); and
determining whether TTI bundling should be enabled or disabled for said at least one UE based on said frequency-selective channel quality information;
wherein said step of determining whether TTI bundling should be enabled or disabled comprises the steps of:
determining whether there is a set of PRBs satisfying a threshold quality based on the frequency-selective channel quality information; and
deciding whether TTI bundling should be enabled or disabled for said at least one UE in dependence on whether there is a set of PRBs satisfying the threshold quality; and
wherein TTI bundling is disabled for said at least one UE if there is a set of PRBs satisfying the threshold quality, and TTI bundling is enabled for said at least one UE if there is not a set of PRBs satisfying the threshold quality.

2. The method of claim 1, wherein TTI bundling is enabled or disabled for said at least one UE in dependence on the outcome of said determining step.

3. The method of claim 1, wherein said frequency-selective channel quality information comprises time-filtered frequency-selective channel quality information.

4. The method of claim 1, wherein, if TTI bundling is disabled, at least part of said set of PRBs satisfying the threshold quality is allocated to said at least one UE.

5. The method of claim 1, wherein said step of determining whether there is a set of PRBs satisfying a threshold quality based on the frequency-selective channel quality information is performed for each of a number N of UEs scheduled within the same TTI, where N≥2, and
said step of deciding whether TTI bundling should be enabled or disabled comprises the steps of:
determining, if at least two of said N UEs have a respective set of PRBs satisfying the threshold quality, a degree of overlap between respective sets of PRBs satisfying the given threshold quality;
deciding whether TTI bundling should be enabled or disabled for said at least two UEs based on said degree of overlap.

6. The method of claim 5, wherein TTI bundling is disabled for said at least two UEs if there is a degree of overlap that is lower than a threshold.

7. The method of claim 1, wherein said step of determining whether there is a set of PRBs satisfying a threshold quality is based on determining whether there is at least a number, $K_i$, of contiguous or non-contiguous PRBs satisfying the threshold quality.

8. The method of claim 7, wherein TTI bundling is disabled for a UE if there is a set of at least $K_i$ contiguous PRBs satisfying the threshold quality, and TTI bundling is enabled for a UE if there is not a set of at least $K_i$ contiguous PRBs satisfying the threshold quality.

9. The method of claim 7, wherein said number $K_i$ is set per UE i and representative of an expected number of PRBs to be allocated to the UE given a certain channel quality and/or amount of data in a buffer of the UE.

10. The method of claim 1, wherein said method comprises the steps of:
scheduling said at least one UE for uplink communication;
checking whether TTI bundling is enabled for said at least one UE;
assigning, to a UE for which TTI bundling is enabled (YES), lower priority for selecting PRBs than non-bundling UEs when allocating Physical Resource Blocks, PRBs, and
assigning, to a UE for which TTI bundling is not enabled (NO), higher priority for selecting PRBs than bundling UEs when allocating PRBs.

11. The method of claim 1, wherein temporal hysteresis is applied for allowing a change between enabled and disabled TTI bundling only when a predetermined period of time has elapsed since the last change between enabled and disabled TTI bundling.

12. A network node configured for handling Transmission Time Interval (TTI) bundling in a radio communication system, wherein said network node comprises:
a memory configured to store frequency-selective channel quality information for at least one User Equipment (UE), wherein said memory is configured to store channel quality information for each of a number of Physical Resource Blocks (PRBs); and
processing circuitry configured to determine whether TTI bundling should be enabled or disabled for said at least one UE based on said frequency-selective channel quality information,
wherein said processing circuitry is configured to determine whether there is a set of PRBs satisfying a threshold quality based on the frequency-selective channel quality information, and to decide whether TTI bundling should be enabled or disabled for said at least one UE in dependence on whether there is a set of PRBs satisfying the threshold quality,
wherein said network node is configured to disable TTI bundling for said at least one UE if there is a set of PRBs satisfying the threshold quality, and to enable TTI bundling for said at least one UE if there is not a set of PRBs satisfying the threshold quality.

13. The network node of claim 12, wherein said processing circuitry is configured to set control information representative of whether TTI bundling should be enabled or disabled, and said network node comprises radio circuitry configured to transmit said control information to said at least one UE.

14. The network node of claim 12, wherein said memory is configured to store time-filtered frequency-selective channel quality information, and said processing circuitry is configured to determine whether TTI bundling should be enabled or disabled based on said time-filtered frequency-selective channel quality information.

15. The network node of claim 12, wherein said network node further comprises an estimator configured to estimate or extract said frequency-selective channel quality information, and a resource allocator configured to allocate, if TTI bundling is disabled, at least part of said set of PRBs satisfying the threshold quality to said at least one UE.

16. The network node of claim 12, wherein said processing circuitry is configured to determine, for each of a number N of UEs scheduled within the same TTI, where N≥2, whether there is a set of PRBs satisfying a threshold quality based on the frequency-selective channel quality information, and to decide, if at least two of said N UEs have a respective set of PRBs satisfying the threshold quality, whether TTI bundling should be enabled or disabled for said at least two UEs based on a degree of overlap between respective sets of PRBs satisfying the given threshold quality.

17. The network node of claim 16, wherein said network node is configured to disable TTI bundling for said at least two UEs if there is a degree of overlap that is lower than a threshold.

18. The network node of claim 12, wherein said processing circuitry is configured to determine whether there is a set of PRBs satisfying a threshold quality based on determining whether there is at least a number, $K_i$, of contiguous or non-contiguous PRBs satisfying the threshold quality.

19. The network node of claim 12, wherein said processing circuitry is configured to assign, to a UE for which TTI bundling is to be used, lower priority for selecting PRBs than non-bundling UEs when allocating Physical Resource Blocks, PRBs, and to assign, to a UE for which TTI bundling is not to be used, higher priority for selecting PRBs than bundling UEs when allocating PRBs.

20. The network node of claim 12, wherein said network node is a radio base station.

21. A non-transitory computer-readable medium comprising, stored thereupon, a computer program comprising program code that when executed by processing circuitry causes the processing circuitry to:
  manage frequency-selective channel quality information for at least one User Equipment (UE), wherein said frequency-selective channel quality information includes channel quality information for each of a number of Physical Resource Blocks (PRBs); and
  determine whether TTI bundling should be enabled or disabled for said at least one UE based on said frequency-selective channel quality information by:
  determining whether there is a set of PRBs satisfying a threshold quality based on the frequency-selective channel quality information; and
  deciding whether TTI bundling should be enabled or disabled for said at least one UE in dependence on whether there is a set of PRBs satisfying the threshold quality, and
wherein TTI bundling is disabled for said at least one UE if there is a set of PRBs satisfying the threshold quality, and TTI bundling is enabled for said at least one UE if there is not a set of PRBs satisfying the threshold quality.

* * * * *